C. S. HARRIS & A. H. CHROMASTA.
BELT SHIFTER.
APPLICATION FILED MAR. 13, 1913.
1,160,403.
Patented Nov. 16, 1915.
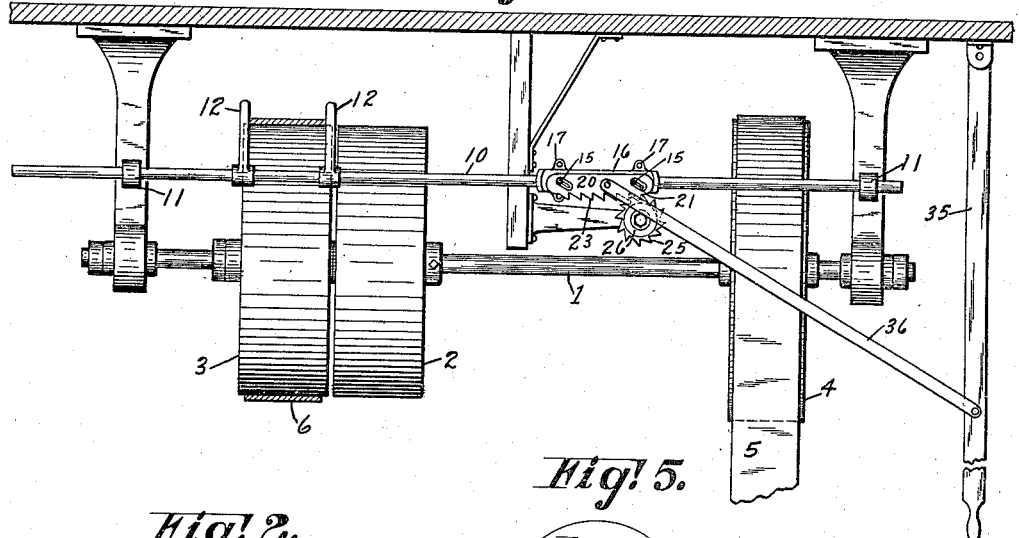
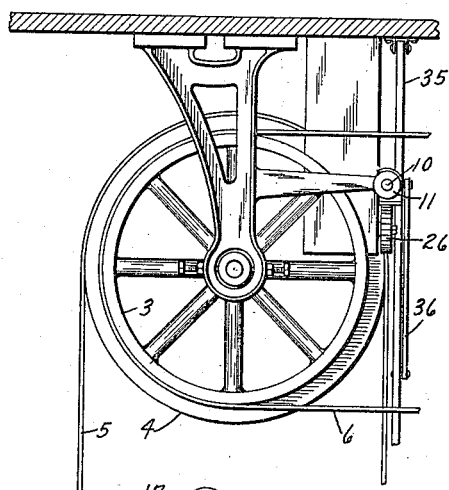
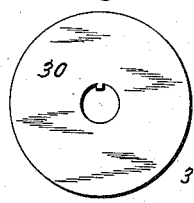
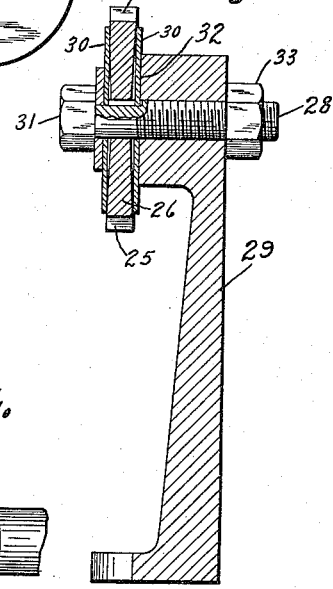
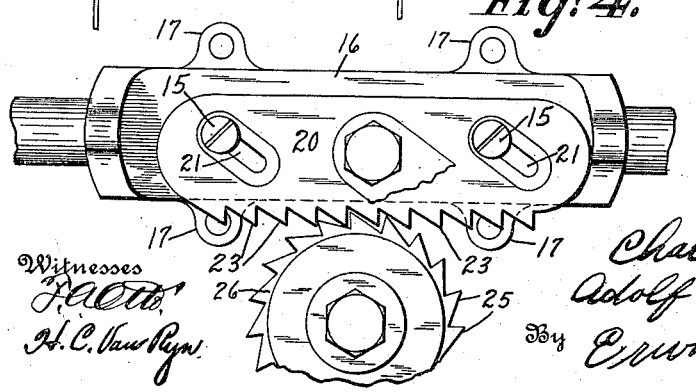
Witnesses
Inventors
Charles S. Harris
Adolf H. Chromasta
By Erwin & Wheeler
Attorneys

UNITED STATES PATENT OFFICE.

CHARLES S. HARRIS AND ADOLF H. CHROMASTA, OF MILWAUKEE, WISCONSIN, ASSIGNORS OF ONE-FOURTH TO WILLIAM F. BARTELS AND ONE-FOURTH TO HERBERT H. GRUNDMANN, BOTH OF MILWAUKEE, WISCONSIN.

BELT-SHIFTER.

1,160,403.  Specification of Letters Patent.  Patented Nov. 16, 1915.

Application filed March 13, 1913.  Serial No. 753,902.

*To all whom it may concern:*

Be it known that we, CHARLES S. HARRIS and ADOLF H. CHROMASTA, citizens of the United States, residing at Milwaukee, county of Milwaukee, and State of Wisconsin, have invented new and useful Improvements in Belt-Shifters, of which the following is a specification.

Our invention relates to improvements in belt shifters.

The object of our invention is to provide means whereby the accidental shifting of a belt from one pulley to another may be prevented. Also to provide means for regulating the shifting movement from the loose to the fixed pulley by providing sufficient resistance to the movement of the belt shifting lever to prevent quick or jerking movements as well as accidental movements. Also to provide means whereby such resistance may be minimized when shifting the belt from the fixed to the loose pulley, whereby the latter operation may be performed with substantially the same ease and quickness as in the operation of an ordinary belt shifter.

In the drawings—Figure 1 is a front elevation of a counter shaft mechanism embodying our invention. Fig. 2 is an end elevation of the same. Fig. 3 is a detail sectional view of the motion regulating ratchet and its support. Fig. 4 is a detail front elevation on a larger scale than in Fig. 1, of the rack and ratchet mechanism. Fig. 5 is a detail view of one of the friction disks 30.

Like parts are identified by the same reference characters throughout the several views.

The counter shaft 1 is provided with a pulley 2 fixed thereon, and a pulley 3 loosely mounted thereon as in ordinary practice. 4 is the driving pulley, 5 is the driving belt, and 6 is the driven belt employed in connection with the counter shaft. A belt shifting rod 10 is mounted in suitable supporting bearings 11, and is provided with arms 12 which are adapted to loosely engage the driven belt 6, whereby the latter may be shifted from loose pulley 3 to fixed pulley 2 and back again. All of these parts may be of ordinary construction except that the rod 10 is provided with projections 15 on one side which may consist of headed pins or screws mounted upon one of a set of clamping members 16 which embrace the rod 10 and are secured thereto by bolts passing through the clamping ears 17. It is not material to our invention whether projections 15 are connected to the rod 10 by means of the aforesaid clamping members or not, but the clamping members form a convenient support for these projections. The rod 10 may be squared or feathered in the bearings 11 to prevent it from rotating.

A rack 20 is provided with diagonal slots 21 through which the projections 15 extend, said projections serving to support the rack from the rod 10. The rack tends to move downwardly by gravity and owing to the angular inclinations of the slots 21, it also tends to move toward the right (in the construction illustrated) until the projections 15 engage the upper ends of the slot walls, in which position teeth 23 on the lower margin of the rack are permitted to engage the teeth 25 of a ratchet wheel 26 supported directly underneath the rack.

The ratchet wheel 26 is loosely mounted upon a stud shaft or bolt 28, carried by a bracket 29. The ratchet wheel has sides which are slightly concaved, and these sides are embraced between a pair of friction disks 30 which are keyed to the bolt 28 or otherwise held against rotation thereon. The bolt 28 has threaded engagement in the supporting bracket 29. By turning the bolt head 31 to bind the friction disks 30 and ratchet wheel 26 between said bolt head and bracket shoulder 32, said friction disks 30 are caused to exert a frictional pressure upon the sides of the ratchet wheel 26. A lock nut 33 may be employed to hold the bolt 28 in any desired position of adjustment, the threads on the bolt being pinched so that when the ratchet wheel is turned, as hereinafter described, the lock nut will prevent the bolt from turning.

In view of the fact that the disks 30 are held against rotation by the bolt 28 and prevented from rotating, it is obvious that in order to rotate the ratchet member 26 it is necessary to overcome the friction of the disks 30 on the sides thereof.

A belt shifting operating lever 35 is connected by a link 36 with the rack 20. When the parts are in the position shown in Fig. 1, the belt 6 is mounted upon the loose pulley 3, and to shift the belt to the fixed pulley, it is necessary to pull lever 35 to the right. The teeth on the rack 20 are pitched to the right, while those on the ratchet wheel are pitched in the opposite direction, whereby when the lever 35 is pulled to the right, the rack teeth 23 will necessarily actuate the ratchet wheel 26, not only for the reason that the teeth tend to pull together by the mutual engagement of their contacting surfaces, but also for the reason that link 36 is connected with lever 35 below the point at which rack 20 is located. The resistance of the friction disks 30 to the rotation of the ratchet wheel 26 is sufficient, when properly adjusted, to require a substantial pull upon the lever 35 in order to move the rod 10 and shift the belt to the fixed pulley, but said friction is not sufficient to require the operator to jerk the lever in order to accomplish this movement. To restore the belt 6 to the loose pulley, it will of course be necessary to swing lever 35 to the left when the arrangement is as illustrated, in which case the link 36 will first push the rack 20 upwardly and to the left until the pins 15 engage the lower ends of the slot walls. The rack teeth will then be entirely out of engagement with the teeth 25, whereupon a continued movement of lever 35 to the left moves rod 10 as freely as if the ratchet wheel 26 were not present. But as soon as the operator releases lever 35, rack 20 again drops by gravity to its position as shown in Fig. 1.

It will be understood that the clamping members 16 and the rack 20 may be reversed in position upon the rod 10 when the fixed pulley is to the left of the loose pulley. In such case, the bracket 29 will, of course, be readjusted to support the ratchet wheel 26 in position to resist the left hand movement of the rack 20, rod 10 and belt shifting arms.

We claim—

1. The combination with a belt shifting rod provided with belt engaging arms, of a motion resisting ratchet member adjacent to said rod, and a device on the rod operatively connected with the lever and adapted for independent movement laterally to the axis of the rod into engagement with said motion resisting ratchet when the lever is moved in one direction, said device being adapted to move retractively away from the ratchet when the lever is moved in the other direction.

2. The combination with a belt shifting rod provided with belt engaging arms, of a rod actuating lever, and a motion resisting member adjacent to the rod adapted to move with uniform resistance when actuated, and a device on said rod operatively connected with the lever and adapted to move independently of the rod into engagement with said motion resisting member when the lever is moved in one direction, said device being adapted to move with the lever in the opposite direction independently of the motion resisting member without actuating the same.

3. The combination with a shaft provided with loose and fixed pulleys mounted thereon, a belt adapted to be shifted from one pulley to the other, a rod provided with belt shifting arms, a set of projections connected with said rod, a rack provided with angular slots into which said projections extend, a ratchet wheel adapted to be engaged by said rack when the latter is in a depressed position with the projections at the upper ends of said slots, and a belt shifting lever linked to said rack.

4. The combination with a shaft provided with loose and fixed pulleys mounted thereon, a belt adapted to be shifted from one pulley to the other, a rod provided with belt shifting arms, a set of projections connected with said rod, a rack provided with angular slots into which said projections extend, a ratchet wheel adapted to be engaged by said rack when the latter is in a depressed position with the projections at the upper ends of said slots, a belt shifting lever linked to said rack, an axial support for the ratchet wheel, a set of friction disks bearing upon the respective sides of the ratchet wheel, means for preventing said disks from rotating, and means for adjusting the pressure of said disks upon the ratchet wheel to regulate the resistance of said wheel to the pressure of the rack thereon when the lever is moved in one direction, said rack slots being adapted to permit it to lift out of engagement with the ratchet wheel when the lever is moved in the other direction.

In testimony whereof we affix our signatures in the presence of two witnesses.

CHARLES S. HARRIS.
ADOLF H. CHROMASTA.

Witnesses:
WILLIAM F. BARTELS,
HERBERT F. GRUNDMANN.

Copies of this patent may be obtained for five cents each, by addressing the "Commissioner of Patents, Washington, D. C."